United States Patent
Menzel et al.

(10) Patent No.: US 11,770,688 B2
(45) Date of Patent: Sep. 26, 2023

(54) ANTENNA MODULE, CONTROL UNIT AND MOTOR VEHICLE

(71) Applicant: Continental Teves AG & Co. oHG, Frankfurt am Main (DE)

(72) Inventors: Marc Menzel, Weimar (DE); Ulrich Stählin, Rochester, MI (US)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 679 days.

(21) Appl. No.: 16/628,829

(22) PCT Filed: Aug. 1, 2018

(86) PCT No.: PCT/DE2018/200071
§ 371 (c)(1),
(2) Date: Jan. 6, 2020

(87) PCT Pub. No.: WO2019/024964
PCT Pub. Date: Feb. 7, 2019

(65) Prior Publication Data
US 2020/0162865 A1    May 21, 2020

(30) Foreign Application Priority Data
Aug. 2, 2017 (DE) .................. 10 2017 213 333.3

(51) Int. Cl.
*H04W 4/40* (2018.01)
*H01Q 1/32* (2006.01)
*H04B 1/3822* (2015.01)
*H04L 12/40* (2006.01)

(52) U.S. Cl.
CPC ............ *H04W 4/40* (2018.02); *H01Q 1/3275* (2013.01); *H04B 1/3822* (2013.01); *H04L 12/40013* (2013.01); *H04L 2012/40215* (2013.01); *H04L 2012/40273* (2013.01)

(58) Field of Classification Search
CPC ....................................... H04W 4/40
See application file for complete search history.

(56) References Cited

U.S. PATENT DOCUMENTS

| | | | |
|---|---|---|---|
| 8,265,664 B1 * | 9/2012 | Cenciarelli | H04W 4/12 455/445 |
| 8,838,383 B2 | 9/2014 | Stählin et al. | |
| 9,702,964 B2 | 7/2017 | Stählin et al. | |
| 9,959,751 B2 | 5/2018 | Scherping et al. | |
| 10,186,762 B2 | 1/2019 | Papp et al. | |

(Continued)

FOREIGN PATENT DOCUMENTS

| CN | 102358333 A | 2/2012 |
|---|---|---|
| DE | 102010029485 A1 | 12/2010 |

(Continued)

OTHER PUBLICATIONS

German Search Report for German Application No. 10 2017 213 333.3, dated Jul. 23, 2018, with partial translation, 9 pages.

(Continued)

*Primary Examiner* — Abdeltif Ajid
(74) *Attorney, Agent, or Firm* — RatnerPrestia

(57) ABSTRACT

An antenna module which is provided, in particular, for vehicle-to-X communication, and which performs pre-processing. An associated control unit and an associated motor vehicle are also disclosed.

16 Claims, 1 Drawing Sheet

(56) References Cited

U.S. PATENT DOCUMENTS

| | | | |
|---|---|---|---|
| 10,225,690 | B2 | 3/2019 | Grotendorst et al. |
| 10,454,838 | B2 | 10/2019 | Stählin et al. |
| 2009/0292459 | A1* | 11/2009 | Zuccotti ............ G08G 1/096791 |
| | | | 701/1 |
| 2011/0080302 | A1 | 4/2011 | Muthaiah et al. |
| 2011/0238306 | A1* | 9/2011 | Miucic .................. G01S 5/0284 |
| | | | 701/469 |
| 2012/0239294 | A1 | 9/2012 | Stählin et al. |
| 2013/0165146 | A1 | 6/2013 | Stählins et al. |
| 2013/0339457 | A1* | 12/2013 | Freire ................ G06Q 10/0635 |
| | | | 709/204 |
| 2016/0094669 | A1* | 3/2016 | Karampurwala ....... H04W 4/02 |
| | | | 370/328 |
| 2016/0203711 | A1 | 7/2016 | Scherping et al. |
| 2016/0301615 | A1 | 10/2016 | Stählin et al. |
| 2016/0313450 | A1* | 10/2016 | Jordan .................... G01S 19/49 |
| 2017/0054204 | A1* | 2/2017 | Changalvala ............ H01Q 1/42 |
| 2018/0224554 | A1* | 8/2018 | Zalewski ................ H04W 4/46 |
| 2018/0375199 | A1 | 12/2018 | Papp et al. |
| 2020/0013281 | A1* | 1/2020 | Eriksson ................ G08G 1/161 |
| 2020/0025858 | A1* | 1/2020 | Stählin .................... H04W 4/40 |
| 2021/0263165 | A1* | 8/2021 | Zheng .................... G01S 19/04 |

FOREIGN PATENT DOCUMENTS

| | | |
|---|---|---|
| DE | 102014213771 A1 | 2/2015 |
| DE | 102015207050 A1 | 10/2016 |
| DE | 102015016334 A1 | 6/2017 |
| JP | 2012527142 A | 11/2012 |
| JP | 2016528644 A | 9/2016 |
| WO | 2010043658 A1 | 4/2010 |
| WO | WO-2016046323 A1 * | 3/2016 ............. G01S 19/05 |

OTHER PUBLICATIONS

International Search Report and Written Opinion for International Application PCT/DE2018/200071, dated Jan. 17, 2019, 13 pages.
Chinese Office Action for Chinese Application No. 201880049295, dated Jan. 29, 2021, 10 pages.
Japanese Notice of Reasons for Refusal for Japanese Application No. 2020-500603, dated Jun. 27, 2022, with translation, 11 pages.
Japanese Notice of Reasons for Refusal for Japanese Application No. 2020-500603, dated Jan. 17, 2023 with translation, 6 pages.
Japanese Decision to Grant a Patent for Japanese Application No. 2020-500603, dated Mar. 30, 2023 with transaltion, 3 pages.

* cited by examiner

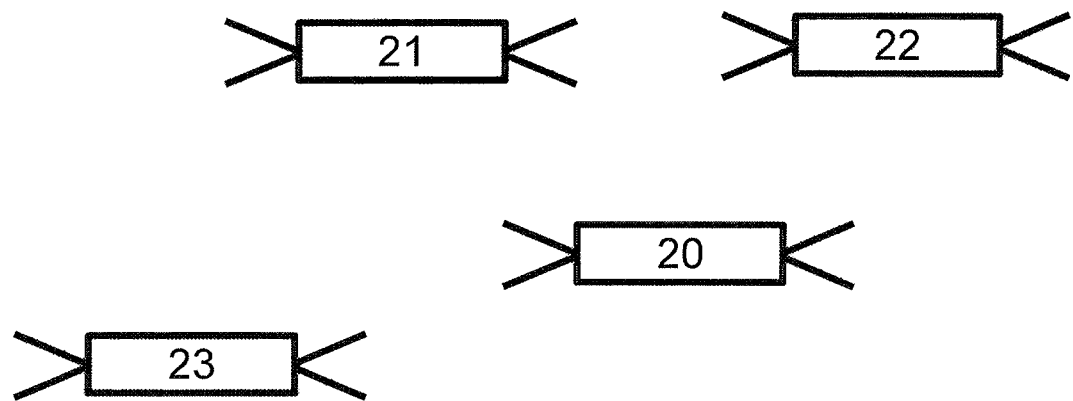
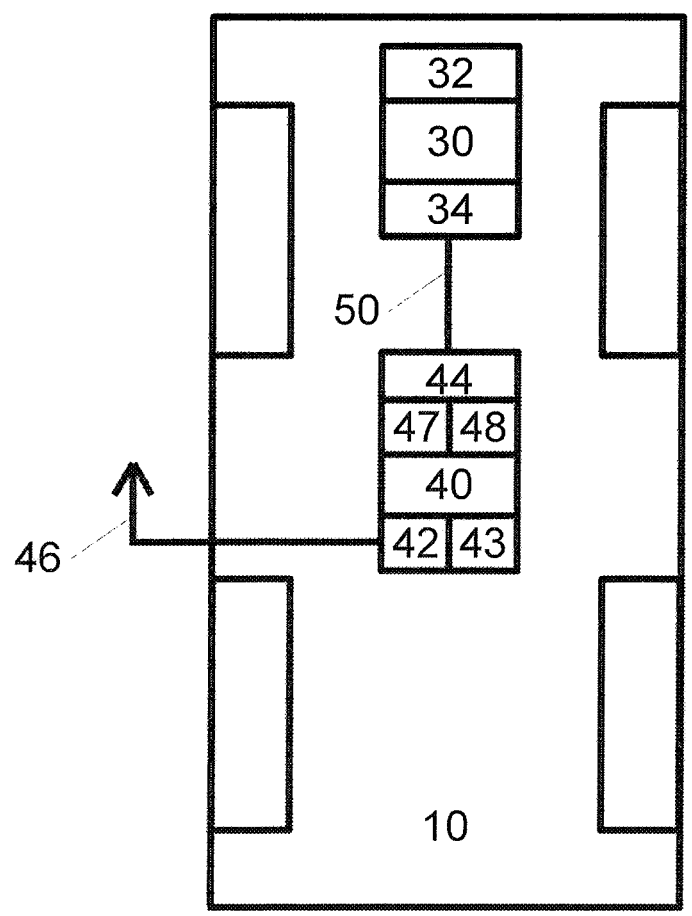

ANTENNA MODULE, CONTROL UNIT AND MOTOR VEHICLE

CROSS REFERENCE TO RELATED APPLICATIONS

This application is the U.S. National Phase Application of PCT International Application No. PCT/DE2018/200071, filed Aug. 1, 2018, which claims priority to German Patent Application No. 10 2017 213 333.3, filed Aug. 2, 2017, the contents of such applications being incorporated by reference herein.

FIELD OF THE INVENTION

The invention relates to an antenna module, a control unit for a motor vehicle as well as a motor vehicle having such an antenna module and such a control unit.

BACKGROUND OF THE INVENTION

Vehicle-to-X communication based on IEEE 802.11p is currently being developed and launched commercially. Intelligent antenna modules (IAM), that is say the combination of antenna radiator and receiver in one unit, are the prior art for various communication technologies. Likewise, the use of satellite navigation for localization is known.

Currently, so-called one-box concepts are typically used for vehicle-to-X communication. This means that all of the necessary electronics are installed in one unit and only passive antennas are connected in order to obtain a functional vehicle-to-X communication system. However, due to the principle of such systems, no synergy effects with other functionalities in the vehicle can be provided.

In order to enhance synergies, so-called two-box concepts are ideally used. For example, a transceiver for vehicle-to-X communication is installed in an intelligent antenna module and this intelligent antenna module is connected to a computing unit, on which the further processing takes place, by a vehicle bus. This can be a typical CAN bus, for example.

Thanks to such a design, it is possible to keep the high-frequency technology away from the integrating unit.

However, it has emerged that the data rates on the vehicle bus are relatively high and, therefore, expensive. In addition, it is difficult to perform localization and time synchronization with such designs.

SUMMARY OF THE INVENTION

Therefore an aspect of the invention is an antenna module, a control unit and a motor vehicle which are improved, for example, in terms of the problems just discussed.

This is achieved according to an aspect of the invention by an antenna module, a control unit and a motor vehicle. Advantageous configurations can, for example, be inferred from the claims. The content of the claims refers expressly to the content of the description.

An aspect of the invention relates to an antenna module. The antenna module has an antenna. In particular, this serves to receive and, if applicable, to also transmit vehicle-to-X messages and, possibly, also other communication. The antenna is in particular the radiator per se in the physical sense.

The antenna module additionally has a receiving unit which is connected to the antenna and is configured to receive vehicle-to-X messages by means of the antenna. In other words, the receiving unit can, for example, be designed to pick up radio signals picked up by the antenna and to convert these into computer-readable messages.

In addition, the antenna module has a bus interface which is connected to the receiving unit, in order to output vehicle-to-X messages to a vehicle bus. As a result, the vehicle-to-X messages can be distributed via the vehicle bus in the vehicle. This can be a CAN bus, for example.

The receiving unit is configured according to an aspect of the invention to perform pre-processing of the received vehicle-to-X messages such that only a portion of the received vehicle-to-X messages are output to the vehicle bus.

As a result of the embodiment according to an aspect of the invention, it is achieved that the number of the messages to be transmitted via the vehicle bus is significantly reduced, in particular in comparison with an embodiment in which all of the messages received by the antenna or respectively converted by the receiving unit are output to a vehicle bus.

It should be mentioned that various procedures are already known for pre-processing. For example, it can be checked whether the respective message is relevant to the vehicle, to which end recourse can be had, for example, to information regarding the location and time of the message or respectively of the vehicle as well as to the type of message and the type of information included. For example, a message regarding emergency braking or regarding the course and speed of a moving vehicle can be discarded if this message obviously originates from a vehicle on a road which the own vehicle or respectively ego vehicle is not driving on. Old messages can also be discarded if they are no longer relevant solely due to the lapse of time.

The receiving unit is preferably configured to perform the pre-processing at least based on an indication of location and/or time information. As a result, messages can be filtered out, for example, which are not relevant to the ego vehicle due solely to different locations or too large distances and/or due to outdated information.

According to a further development, the antenna module has a transmitting unit which is connected to the antenna and the bus interface, in order to transmit vehicle-to-X messages received by the vehicle bus by means of the antenna in an unaltered form. As a result, the antenna module can have a typical functionality for transmitting, i.e. it can be instructed by the vehicle electronics to output an already finished message in an unaltered form. In particular, the fact that the message is transmitted in an unaltered form means that the safety requirements of the antenna module are much lower than if the message were to be altered in the antenna module. For example, ASIL certification can be dispensed with.

It should be mentioned that it can also in principle be provided that the message can be altered in the antenna module. However, this can, if applicable, require a higher safety level or respectively an additional outlay in order to achieve the required safety.

The transmitting unit preferably forms a transceiver unit together with the receiving unit. This makes possible a compact design and, if applicable, a double utilization of components. According to a preferred embodiment, the indication of location and/or time information is/are obtained from vehicle-to-X messages to be transmitted. This means that a separate determination of location or respectively determination of time does not have to be performed and ensures that the pre-processing is performed with the same indication of location which is also used to transmit vehicle-to-X messages. As a result, discrepancies can be avoided. In particular, the indication of location and/or time information is comprised by a header of a vehicle-to-X message to be transmitted. Consequently, the filtering of incoming vehicle-to-X messages can already be effected on the basis of the header information of the vehicle-to-X message to be transmitted and/or incoming vehicle-to-X messages.

According to a preferred embodiment, the antenna module has a satellite navigation module. As a result, the antenna module can determine a location autonomously. Said location can, for example, be supplied to other components in the vehicle. The antenna module can, for example, also be configured to be the central and/or only location-determining unit, in particular by means of satellite navigation, in the vehicle.

According to a further development, the antenna module has a time reference unit which is configured to manage a reference time synchronized with satellite signals and to provide the reference time via the vehicle bus. As a result, it can be avoided that time reference signals such as, for example, 1PPS (one pulse per second) signals, which typically occur in satellite navigation signals, have to be forwarded from the antenna module via the vehicle bus to other vehicle components. Rather, the antenna module can itself provide the time reference and synchronize the latter with any other clocks or respectively time sources present in the vehicle.

The antenna module is preferably designed as an intelligent antenna module. The antenna module can also be designed as a self-contained unit for installation in a vehicle roof. This facilitates the integration into mass production and, if applicable, also replacement. The antenna module can for example be enclosed such that it is watertight and/or dustproof.

An aspect of the invention also relates to a control unit for a motor vehicle. The control unit has a bus interface for connecting to a vehicle bus. The control unit additionally has a data processing unit which is configured to process vehicle-to-X messages received via the vehicle bus from an antenna module according to an aspect of the invention.

The control unit is consequently ideally designed for working with an antenna module according to an aspect of the invention. In particular it can be configured such that it does not carry out any pre-processing of the vehicle-to-X messages. This is already undertaken by the antenna module as described in detail above.

The embodiment of the control unit according to an aspect of the invention makes it possible to dispense with high-frequency components and, consequently, makes possible a significantly better integration with other functions.

The data processing unit is preferably configured to transmit vehicle-to-X messages via the vehicle bus for outputting to the antenna module. Consequently, the full functionality of the vehicle-to-X communication can be achieved by means of the data processing unit or respectively by the interaction thereof with the antenna module according to an aspect of the invention.

According to a further development, the data processing unit is configured to determine a location by means of satellite navigation and/or vehicle sensor technology and to insert said location into the vehicle-to-X messages to be transmitted. To this end, the data processing unit can, for example, perform a determination of location which is also used otherwise. Recourse can be had, for example, to satellite navigation signals which can likewise be received by the antenna module and forwarded to the control unit. The location or respectively location information can in particular be inserted into a header of a respective vehicle-to-X message. It can then be read out, for example, by the antenna module and used for the pre-processing.

The data processing unit and/or other components of the control unit can preferably also be configured for tasks other than vehicle-to-X communication and navigation. For example, this can involve the assumption of various vehicle control tasks or driver assistance systems.

The control unit can, in particular, be executed without high-frequency components or respectively without a transmitting unit and/or receiving unit and/or transceiver unit. This facilitates the integration.

An aspect of the invention also relates to a motor vehicle having an antenna module according to an aspect of the invention and a control unit according to an aspect of the invention. Recourse can be had to all of the embodiments and variants described herein with respect to the antenna module according to an aspect of the invention and the control unit according to an aspect of the invention. The motor vehicle additionally has a vehicle bus. The antenna module and the control unit are connected by means of their respective bus interface to the vehicle bus.

The advantages already indicated above can be achieved by the motor vehicle according to an aspect of the invention.

The antenna module is preferably designed as described above with respect to the supply of a time reference, wherein a number of components of the vehicle are synchronized with the reference time of the antenna module. As a result, a time reference can be advantageously supplied for the entire vehicle as already described above. As a result, the data load in the bus can also be reduced.

In more general terms, an intelligent antenna module is for example proposed for the vehicle-to-X communication, which can be deployed with a very simple, traditional bus system. Nevertheless, the computing time requirement in the intelligent antenna module is as small as possible, in order to keep the costs as low as possible. To this end, as small as possible a microcontroller can be used in the intelligent antenna module, the task of which is in particular to allow the drivers for transceivers to run and to place the vehicle-to-X information on a vehicle bus. Further parts of the vehicle-to-X stack typically run on another vehicle control device or respectively a control unit.

In order to reduce the bus load, pre-processing of the vehicle-to-X data can be performed. The important information for this is, in particular, the ego position. This can be established, for example, from a header of Basic Safety Messages (BSM) or Cooperative Awareness Messages (CAM) to be transmitted. These can, for example, be cyclical vehicle-to-X messages which are transmitted at approx. 10 Hz. The messages or respectively communications themselves can be compiled completely on a vehicle control device, wherein only the dispatch of the messages by means of the driver via the transceiver is preferably otherwise effected in the intelligent antenna module. The position itself can be established in the vehicle control device. To this end, various sensor information can be combined. For example, this can be information from wheel speed sensors, IMU information, a steering wheel angle, satellite navigation (Global Navigation Satellite System=GNSS) information or other information.

A GNSS receiver is preferably likewise located in the intelligent antenna module, with a tracker however being sufficient, for example, since the position is calculated in the vehicle control device and a tight coupling can also be deployed there. The time information is, however, also of interest for the pre-processing and is ideally performed using the so-called 1PPS signals of a GNSS receiver. To ensure that this signal does not have to be forwarded to the vehicle control device with a dedicated signal line, a time synchronization for the complete vehicle can, for example, be performed in the intelligent antenna module and/or the intelligent antenna module can be used as a clock master for the remainder of the vehicle. The provision of the time information is then possible, for example by means of an AUTOSAR 4.2 standard.

It is advantageous that security is only necessary to a very limited extent in the described intelligent antenna module. The vehicle-to-X messages are typically already secured by a Public Key Infrastructure (PKI) and since the pre-processing only removes, but does not alter, the messages, it is typically not necessary to additionally protect the communication route between the intelligent antenna module and vehicle control device. To date, there is no security either for satellite navigation, or respectively if there is from the satellite, it can likewise be observed for the transmission up to the control device. In this respect, only the "normal" bus security is to be applied.

With regard to functional safety for the vehicle-to-X communication, the concept described herein constitutes the advantage that the integrated antenna module, for example in the configuration indicated, can be regarded as a transparent data channel and therefore no particular requirements are to be imposed on this part of the information chain with respect to ASIL. Data processing which is relevant to functional safety within the meaning of ASIL is only to be effected in the vehicle control device or respectively a control unit, and therefore this control device or respectively this control unit is to preferably be developed in accordance with the relevant rules. The position for the pre-processing can, in particular, be obtained via the headers of CAMs or respectively BSMs.

The described antenna module or respectively intelligent antenna module can, for example, also include further radio technologies. For example, it can be used for satellite navigation, telephone or internet access. To this end, recourse can be had to known technologies.

The intelligent antenna module described herein or respectively antenna module typically only performs a few tasks and can therefore be linked with a small microcontroller to a vehicle bus. Due to the small microcontroller, the high temperature requirements in an intelligent antenna module can easily be met and the restricted installation space typically does not constitute an obstacle either. Due to the described few tasks of the microcontroller on the intelligent antenna module or respectively antenna module, this can also be equipped with a simple operating system. For example, an AUTOSAR can be used for this. A more complex operating system and also a much more powerful computing unit can then be used in a vehicle control device or respectively a control unit, without restrictions regarding the temperature and installation space having repercussions in the intelligent antenna module.

In addition, it is easily possible to have an antenna module or respectively intelligent antenna module and a vehicle control device developed by different companies, as only communications or respectively messages described by external standards are sent via a vehicle bus and no extra communications have to be defined for the pre-processing.

It is understood that an aspect of the invention has been described here with reference to motor vehicles, but it can in principle also be deployed in other applications, for example in rail vehicles, people movers, watercraft or aircraft.

In addition, it is understood that the procedures described herein can also be construed in an antenna module and a control unit as aspects of respective methods according to an aspect of the invention. An aspect of the invention also comprises such methods in all variations. An aspect of the invention also comprises a non-volatile, computer-readable storage medium which contains program code which, when it is run, executes such a method.

BRIEF DESCRIPTION OF THE DRAWINGS

The person skilled in the art will infer further features and advantages from the embodiment example described below with reference to the appended FIGURE, wherein:

The FIGURE shows a motor vehicle according to an aspect of the invention having an antenna module according to an aspect of the invention and a control unit according to an aspect of the invention.

DETAILED DESCRIPTION OF THE PREFERRED EMBODIMENTS

The FIGURE shows a motor vehicle 10 merely schematically. Furthermore, four satellites 20, 21, 22, 23 are likewise shown merely schematically. These are typical satellites of a satellite navigation system such as GPS. The satellites 20, 21, 22, 23 constantly output signals with which a determination of the location of the motor vehicle 10 is possible and which additionally provide a global reference time.

The motor vehicle 10 has a control unit 30. The control unit 30 has a data processing unit 32 as well as a bus interface 34.

The motor vehicle 10 additionally has an antenna module 40. In the present case, this is an intelligent antenna module which is designed as an autonomous unit and installed in a vehicle roof which is not represented in more detail.

The antenna module 40 has a receiving unit 42. It additionally has a transmitting unit 43.

Together, the receiving unit 42 and the transmitting unit 43 form a transceiver unit.

The antenna module 40 has a bus interface 44.

Furthermore, the antenna module 40 has an antenna 46 which is installed such that it can receive radio signals from outside the motor vehicle 10 and can also transmit radio signals to the surroundings of the motor vehicle 10.

Finally, the antenna module 40 has a satellite navigation module 47 as well as a time reference unit 48.

The two bus interfaces 34, 44 of the control unit 30 or respectively of the antenna module 40 are connected to one another as shown by means of a schematically represented vehicle bus 50 of the motor vehicle 10. This is a typical vehicle CAN bus. The bus interfaces 34, 44 can consequently exchange data.

If a radio wave which includes a vehicle-to-X message is received by the antenna 46, this is detected by the receiving unit 42. The receiving unit 42 is configured to produce the vehicle-to-X message from such a received radio wave such that it is computer-readable.

The receiving unit 42 is furthermore configured to perform pre-processing. To this end, the receiving unit 42 compares inter alia how old the vehicle-to-X message is and whether it is relevant at all to the motor vehicle 10—due to the location information contained therein—in relation to the current position of the motor vehicle 10. If the receiving unit 42 should reach the conclusion that the relevant vehicle-to-X message is not relevant to the motor vehicle 10, it is immediately separated and is not further processed or forwarded. If, however, the vehicle-to-X message appears to be relevant, it is forwarded by the receiving unit 42 to the bus interface 44 of the antenna module 40 which delivers it into the vehicle bus 50. The vehicle bus 50 then transfers the vehicle-to-X message to the bus interface 34 of the control unit 30. The vehicle-to-X message can then be used in a suitable manner in the data processing unit 32 of the control unit 30, for example in order to calculate whether, due to the information contained in the vehicle-to-X message, there is an increased risk of accidents for the motor vehicle 10 or other measures are to be initiated. The vehicle-to-X message can also be forwarded to other components of the motor vehicle 10.

If an application which runs, for example, in the data processing unit 32 of the control unit 30 would like to transmit a vehicle-to-X message, it transmits the latter to the bus interface 34 of the control unit 30. From there, it arrives in the vehicle bus 50 which transports the vehicle-to-X message to the bus interface 44 of the antenna module 40. The vehicle-to-X message then arrives at the transmitting unit 43 and is converted by the latter into radio signals without any alteration. These are then emitted via the antenna 46. Consequently, it is also possible to transmit vehicle-to-X messages via the same channel, with which vehicle-to-X messages are received.

Typically, location information is contained in a vehicle-to-X message to be transmitted, in particular in the header thereof. This location information can be read out by the antenna module 40 and can be used for the pre-processing described above.

Due to the decoupling of the high-frequency technology, which is substantially contained in the receiving unit 42 and the transmitting unit 43, from the electronics contained in the data processing unit 32, a significantly higher level of integration of the control unit 30 is possible. Said control unit can also perform other tasks.

The satellite navigation module 47 is configured to receive satellite navigation signals from the satellites 20, 21, 22, 23 by means of the antenna 46 and to convert these into location information. This location information can then, in particular, be transmitted via the vehicle bus 50 to the control unit 30 where a location of the motor vehicle 10 is determined. This location can be used for numerous other functions, in particular in a vehicle-uniform manner. It can also be inserted into vehicle-to-X messages to be transmitted.

The time reference unit 48 is configured to extract time information from the signals of the satellites 20, 21, 22, 23. These are, in particular, the known 1PPS (one pulse per second) signals which each display the start of a new second. An internal clock of the time reference unit 48 can be synchronized therewith. In the present case, the internal clock then serves as a time reference for the entire motor vehicle 10 which is synchronized by means of AUTOSAR protocols with other components of the motor vehicle 10.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p or IEEE 1609.4. Vehicle-to-X communication can also be referred to as C2X communication. The sub-areas can be referred to as C2C (Car-to-Car) or C2I (Car-to-Infrastructure). An aspect of the invention expressly does not, however, exclude vehicle-to-X communication with the intermediary of, for example, a mobile network.

The claims which form part of the application do not constitute a waiver of the attainment of more extensive protection.

If in the course of the proceedings it transpires that a feature or a group of features is not absolutely necessary, then the applicant here and now seeks a wording of at least one independent claim, no longer comprising the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention, which are described in the various embodiments or embodiment examples and/or shown in the FIGURES, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

The invention claimed is:

1. An antenna module, comprising:
   an antenna;
   a receiver which is connected to the antenna and is configured to receive vehicle-to-X messages by the antenna; and
   a bus interface which is connected to the receiver, in order to output vehicle-to-X messages to a vehicle bus,
   wherein the receiver is configured to perform pre-processing of the received vehicle-to-X messages such that fewer than all of the received vehicle-to-X messages are output to the vehicle bus,
   wherein
   the receiver is configured to perform the pre-processing at least based on location information associated with the received vehicle-to-X messages.

2. The antenna module according to claim 1,
   wherein the antenna module has a transmitter which is connected to the antenna and the bus interface, in order to transmit vehicle-to-X messages received by the vehicle bus by the antenna in an unaltered form.

3. The antenna module according to claim 2,
   wherein the transmitter forms a transceiver together with the receiver.

4. The antenna module according to claim 1,
   wherein the location information is obtained from vehicle-to-X messages to be transmitted.

5. The antenna module according to claim 1,
wherein the antenna module has a satellite navigation module.

6. The antenna module according to claim 1,
wherein the antenna module has a time reference which is configured to synchronize a reference time with satellite signals and to provide the reference time via the vehicle bus.

7. The antenna module according to claim 1,
wherein the antenna module is designed as an intelligent antenna module.

8. The antenna module according to claim 1,
wherein the antenna module is designed as a self-contained unit for installation in a vehicle roof.

9. A control unit for a motor vehicle, comprising:
a bus interface for connecting to a vehicle bus, and
a data processor which is configured to process vehicle-to-X messages received via the vehicle bus from an antenna module according to claim 1.

10. The control unit according to claim 9,
wherein the data processor is configured to transmit vehicle-to-X messages via the vehicle bus for outputting to the antenna module.

11. The control unit according to claim 10,
wherein the data processor is configured to determine a location by satellite navigation and/or vehicle sensor technology and to insert said location into the vehicle-to-X messages to be transmitted.

12. The control unit according to claim 9,
wherein the data processor and/or other components of the control unit are also configured for tasks other than vehicle-to-x communication and navigation.

13. The antenna module according to claim 1,
wherein the receiver is further configured to perform the pre-processing based on time information.

14. The antenna module according to claim 1,
wherein the receiver is configured to perform the pre-processing based on the location information associated with the received vehicle-to-X messages relative to a current position of the motor vehicle.

15. A motor vehicle, comprising:
a vehicle bus,
an antenna module comprising:
an antenna;
a receiver connected to the antenna and configured to receive vehicle-to-X messages by the antenna; and
a bus interface which is connected to the receiver, in order to output vehicle-to-X messages to the vehicle bus,
wherein the receiver is configured to perform pre-processing of the received vehicle-to-X messages such that fewer than all of the received vehicle-to-X messages are output to the vehicle bus, and
wherein the receiver is configured to perform the pre-processing at least based on location information associated with the received vehicle-to-X messages,
a control unit comprising:
a bus interface for connecting to the vehicle bus, and
a data processor which is configured to process the vehicle-to-X messages received via the vehicle bus from an antenna module, and
wherein the antenna module and the control unit are connected to the vehicle bus by their respective bus interfaces.

16. The motor vehicle according to claim 15,
wherein the antenna module has a time reference which is configured to synchronize a reference time with satellite signals and to provide the reference time via the vehicle bus and a number of components of the motor vehicle are synchronized with the reference time of the antenna module.

* * * * *